United States Patent [19]

Kitaura et al.

[11] Patent Number: 4,943,858
[45] Date of Patent: Jul. 24, 1990

[54] TV SIGNAL RECORDING AND REPRODUCING APPARATUS EMPLOYING A DIGITAL INTERFACE AND INCLUDING SIGNAL DROP-OUT COMPENSATION

[75] Inventors: Hiromu Kitaura, Osakasayama; Yuichi Ninomiya; Yoshimichi Ohtsuka, both of Kawasaki; Yoshinori Izumi, Tokyo, all of Japan

[73] Assignee: Matsushita Electric Industrial Co., Ltd., Osaka, Japan

[21] Appl. No.: 314,089

[22] Filed: Feb. 23, 1989

[51] Int. Cl.$^5$ .................... H04N 5/213; H04N 9/88; H04N 5/94
[52] U.S. Cl. .................... 358/167; 358/314; 358/336; 360/38.1
[58] Field of Search .................... 358/314, 336, 167; 360/38.1

[56] References Cited

U.S. PATENT DOCUMENTS

| | | | |
|---|---|---|---|
| 4,203,134 | 5/1980 | Christopher et al. | 358/314 |
| 4,245,262 | 1/1981 | Ohtsu | 338/314 |
| 4,313,129 | 1/1982 | Fukui | 358/314 |
| 4,736,238 | 4/1988 | Moriyama et al. | 358/314 |

OTHER PUBLICATIONS

"A Single Channel Transmission System for HDTV Satellite Broadcasting (MUSE)", by Yuichi Ninomiya, et al., System Circuit Research Group for the Institute of Television Engineers of Japan, TEBS 95-2, Mar. 22, 1984, The Report of the Institute, vol. 7, No. 44.

Primary Examiner—John K. Peng
Attorney, Agent, or Firm—Stevens, Davis, Miller & Mosher

[57] ABSTRACT

A recording and reproducing apparatus is disclosed in whic

3 Claims, 3 Drawing Sheets

TV SIGNAL RECORDING AND REPRODUCING APPARATUS EMPLOYING A DIGITAL INTERFACE AND INCLUDING SIGNAL DROP-OUT COMPENSATION

BACKGROUND OF THE INVENTION

The present invention relates to a recording and reproducing apparatus for television signals.

A compressed band transmission system has been proposed in which a high-definition ("High Vision") video signal for producing a more definite image than the standard television system is transmitted by use of a channel of 27 MHz in band width of a broadcasting satellite.

Such a transmission system is reported in "A Single Channel Transmission System for HDTV Satellite Broadcasting (MUSE)", by Yuichi Ninomiya, et al., System Circuit Research Group for The Institute of Television Engineers of Japan, TEBS 95-2, March 22, 1984, The Report of the Institute, Vol. 7, No. 44.

In the transmission system discussed in the above-noted reference, a High Vision (high-definition TV) signal having an original band width more than 20 MHz is compressed to about 8 MHz by sub-Nyquist sampling for transmission. In the case of a still image, transmission of one image is completed with four fields, that is, two frames. As a result, the receiver contains a memory of two frames in terms of transmission signal rate, and an image is completed by inter-frame interpolation supplementation of a transmitted incoming television signal.

The above system, on the other hand, which compresses the television signal to the band width of about 8 MHz from more than 20 MHz, is useful for recording and reproduction as well as for the satellite broadcasting and therefore applications to VTR and video disk are considered. In the future, for the reproduction of these recorded signals, such a MUSE decoder of the receiver will be built in the body of VTR or video disk drive apparatus as the case may be, but for the time being it will continue to be used in combination with the receiver.

Conventionally, signal connection between a recording and reproducing system of a VTR, video disk or the like and the tuner or monitor is accomplished by a composite NTSC signal in analog form. Especially in the case of a High Vision signal, the image pick-up and recording are required in the base band of 20 MHz, and therefore the broad band signal processing including image contour compensation and time base collector requires digital signal processing. As a result, an analog-digital conversion or digital-analog conversion (hereinafter referred to as "A/D" or "D/A" respectively) is repeated each time as necessary, thus giving rise to the likelihood of a deteriorated image quality. Further, the MUSE decoder of the receiver processes signals digitally, and therefore if the interface with the receiver is taken with analog signals for recording in a VTR, an additional A/D or D/A process is required, thereby further deteriorating the image quality. Therefore, it is considered that the number of times of A/D and D/A operations may be reduced if the interface between the receiver and VTR is taken with digital signals. A block diagram for digital signal interface between units is shown in FIG. 2.

In FIG. 2, reference numeral 1 designates a BS tuner for receiving tuning and FM demodulating of the SHF wave for satellite broadcasting, numeral 2 an A/D converter for converting the demodulated signal to a digital signal, numeral 3 a digital preprocessing circuit for de-emphasis or the like, and numeral 4 an input signal change-over switch with a terminal connected to an output of the de-emphasis 3 and the other terminal for an external signal of VTR or the like. Numeral 5 designates a body of a MUSE decoder, numeral 6 a D/A converter, numeral 7 a monitor for displaying a high-definition signal, numeral 8 a signal processing section for expansion or the like processing along a time axis for VTR recording, numeral 9 a D/A converter, numeral 10 a recording and reproduction section for recording in or reproducing from tape or the like means by FM modulation and effecting FM demodulation, numeral 11 an A/D converter, and numeral 12 a signal processing section for time base compression for converting a time base expanded signal to the original MUSE signal in order for VTR recording or TBC for removing jitters of the reproduction signal. In FIG. 2, the parts designated by numerals 1 to 6 represent a receiver and those represented by numerals 8 to 12 a recording and reproduction system such as a VTR.

The advantage of taking digital instead of analog interface between the receiver and the recording and reproduction system is that the number of times of signal processing through the A/D and D/A converters is reduced by one respectively. In spite of this, the analog interface requires only one coaxial cable, whereas the digital version for 8-bit image data, for example, required ten signal cables including those for a clock signal and the earth (ground) line. Further, the lack of a reproduction FM signal called a "drop-out" which occurs in a VTR or the like is usually supplemented by the signal preceding by one horizontal scanning period (hereinafter called "1H") using a line memory within the VTR. In the case of MUSE signal, however, a signal preceding by two frames must be supplemented by use of a frame memory within the decoder, and for this purpose, an additional signal line is necessary for transmitting or informing a drop-out period from the VTR to the receiver. Most of the receivers and the recording and reproduction systems, by their nature, are consumer products, and therefore the number of their signal lines or the like should be decreased as much as possible. Also the recording and reproducing systems usually do not have or need not output a drop-out indicating pulse on the recording side, so it is desirable to use some other signal output connectors in common for such a pulse connector. In other words it is not desirable to add a signal line solely for transmission of drop out pulses.

SUMMARY OF THE INVENTION

The object of the present invention is to provide a recording and reproducing apparatus having an interface with a receiver, which comprises means for supplying to and recording in the apparatus a set of digital image data with a clock signal after preprocessing of the receiver, means in reproduction mode for reproducing, signal-processing and supplying a set of digital image data and a clock signal from the apparatus to the receiver, means in the receiver for controlling the oscillation frequency and phase of an internal reference oscillator on the basis of the clock signal thus supplied, means for interrupting, when a drop-out occurred in the apparatus the clock signal supplied together with the image data of the reproduction signal, for duration of the drop-out, and means in the receiver for detecting the interruption of the clock signal, compensating for a drop-out by an internal memory and holding the control signal of the internal reference oscillator to its value immediately before the interruption of the clock signal.

According to the present invention, there is provided the above-mentioned arrangement characterized by detecting a drop-out during a VTR reproduction, gating and interrupting the clock signal supplied parallelly with a reproduction signal as the digital image data to the receiver by the detected dropout signal, and characterized by in the receiver controlling the internal reference oscillator for phase synchronization on the basis of the clock signal supplied from the apparatus and demodulating the image data into the original high-definition signal by a MUSE decoder. Further, for the period when the clock signal is interrupted by a drop-out, the phase control signal of the internal reference oscillator is held to its value immediately before the interruption of the clock signal in order to prevent the disturbance of the oscillation, while at the same time compensating for the drop-out by use of a memory in the MUSE decoder.

According to the present invention, the number of signal lines which would otherwise naturally increase when the interface is made for a digital signal between the recording and reproducing apparatus and the receiver can be reduced by having a signal line shared by the clock signal and the drop-out detection signal, which in turn makes possible a shared use of a connection line on the recording side. Further, should VTR power fail or the connection line be disconnected during reproduction, the clock signal is cut off, so that the MUSE decoder is automatically held in frame still mode, thereby preventing the disappearance of the monitor picture or disturbance by noise. In this way, the receiver and a recording and reproduction apparatus with a very high definition can be provided.

DESCRIPTION OF THE PREFERRED EMBODIMENTS

Figure 1:
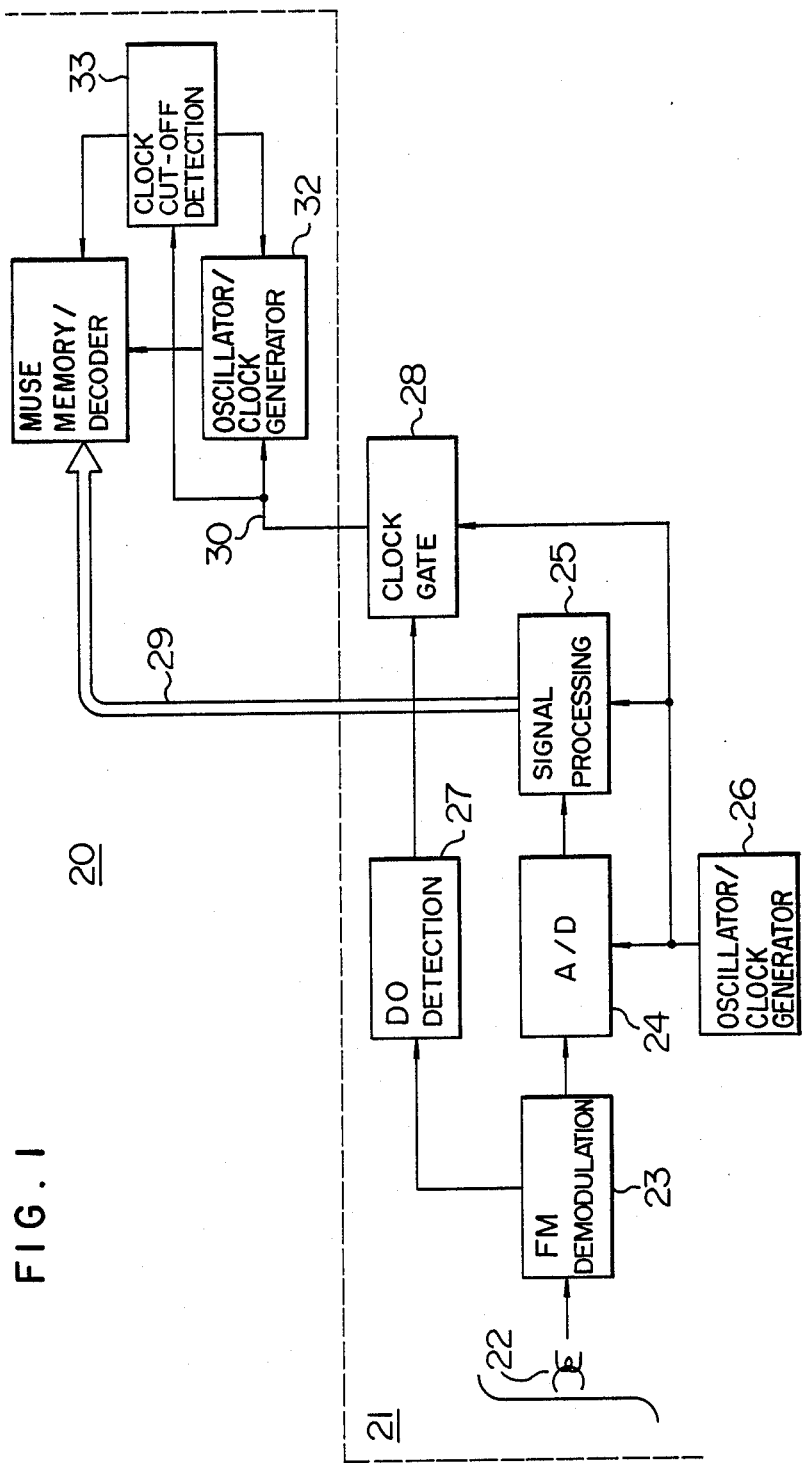
FIG. 1 is a block diagram showing the reproduction system of a recording and reproduction apparatus and the MUSE decoder of a receiver according to an embodiment of the present invention.

The reproduction system of a recording and reproduction apparatus and the MUSE decoder of a receiver according to the present invention are shown in the block diagram of FIG. 1.

Figure 2:
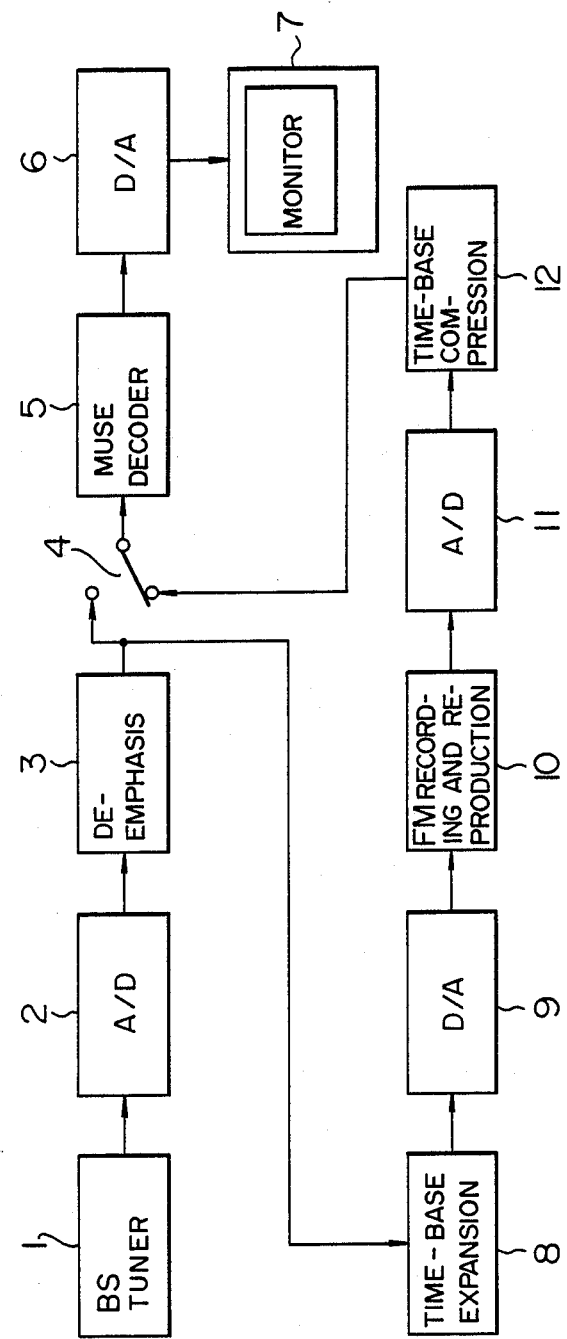
FIG. 2 is a block diagram showing an example of connection in the digital interface between a receiver and a recording and reproduction apparatus according to the prior art.

In FIG. 1, numeral 20 designates the receiver, and numeral 21 the recording and reproduction apparatus. Numeral 22 designates a tape-head system, numeral 23 an FM demodulation circuit, numeral 24 an A/D converter, numeral 25 a signal processing circuit for such operation as time base compression or TBC as explained with reference to FIG. 2, numeral 26 a clock signal generator including an internal reference oscillator, numeral 27 a circuit for detecting a dropout from a reproduced FM signal, numeral 28 a clock gate circuit for gating the clock signal to the receiver on the basis of the detected dropout signal, numeral 29 a signal line for an 8-bit digital image data, and numeral 30 a signal line for the clock signal. Numeral 31 designates a MUSE decoder having an internal two-frame memory for demodulating the MUSE signal in the form of a reproduced digital image data into a high definition signal. Numeral 32 designates a clock generator constituting what is called a PLL circuit for comparing the phase of the above-inputted clock signal with that of an internal clock signal produced by dividing the oscillation frequency of the internal reference oscillator thereby to control the oscillation phase of the oscillator to keep the phase difference to zero. In the case where the input clock signal is interrupted, the clock generator is adapted to cut-off the output of phase comparison with the internal clock, and to hold the value immediately before clock interruption to prevent "jitter" of the oscillation phase.

A drop-out is generally as short as several to several tens of $\mu S$, and therefore the cut-off of the clock signal continuing as long as this has no effect on the PLL circuit at all. Numeral 33 designates a clock cut-off detection circuit for constantly monitoring the clock signal thus supplied and, if it is cut off, supplying a pulse of duration representing the cut off period to the MUSE decoder 31 and the clock generator 32. In the MUSE decoder, a drop out is compensated for by suspending the writing of a new image data in the two-frame memory built therein for the period of the drop out and by thus using the data preceding by two frames. There are of course other methods of drop-out compensation.

Figure 3:
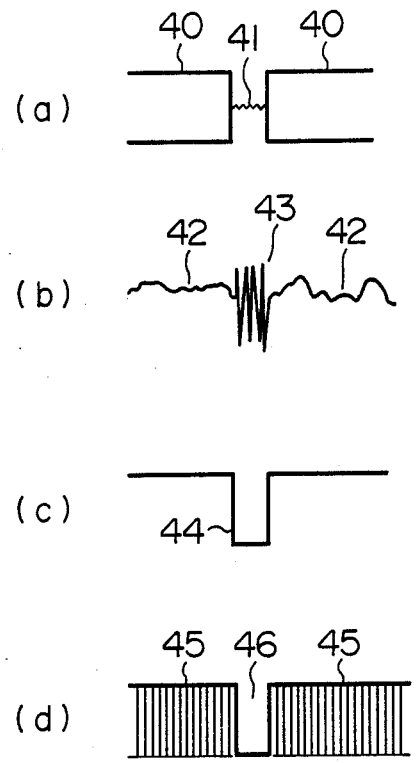
FIGS. 3a–3d are diagrams showing signal waveforms produced at various parts in the embodiment of the present invention.

FIG. 3 shows conditions of various signals before the interruption of the clock by a drop-out. In FIG. 3, (a) designates an FM reproduction signal, in which numeral 40 designates an FM wave and numeral 41 an interruption of the FM wave by a drop-out; (b) an FM demodulation waveform in which numeral 42 designates a normal video signal demodulated, and numeral 43 a large noise caused by a drop-out; (c) a drop-out detection pulse in which numeral 44 designates a drop-out period; and (d) a clock signal supplied to the receiver in which numeral 45 designates a period of normal reproduction and numeral 46 a drop-out period when the clock signal is interrupted. This diagram shows only the principle and specific timings may of course actually be different from this diagram.

The circuits included in this embodiment are all well known and therefore will not be described in detail.

We claim:

1. A drop-out compensation apparatus for a recording and reproduction system comprising:
   a receiver for receiving digital image data from said recording and reproducing system, said receiver comprising means for decoding received image data and a reference oscillator clock generator for controlling said decoding means;
   means for supplying said receiver with a clock signal and a set of digital image data for an image signal reproduced and processed by said recording and reproducing system, said clock signal being supplied to said reference oscillator clock generator to control the phase and frequency thereof and said image data being supplied to said decoding means;
   means for interrupting the supply of said clock signal to said reference oscillator clock generator for the period of a drop-out, if any, in the recording and reproducing system;

said receiver further comprising means for detecting an interruption in the supply of said clock signal to said reference oscillator clock generator for causing said decoding means to compensate for said drop-out by using previously stored image data and for causing said reference oscillator clock generator to hold a frequency and phase determining control signal to the value thereof immediately preceding the interruption in the supply of said clock signal.

2. An apparatus as in claim 1, wherein said recording and reproducing system comprises means for converting an analog television signal to a digital image signal; and means for de-emphasis processing of said digital image signal, said supplying means supplying a de-emphasis processed digital image signal to said decoding means.

3. A drop-out compensation apparatus for a receiver used with a recording and reproduction system, said apparatus comprising:

means for supplying the receiver with a clock signal and a set of digital image data representing an image signal reproduced and processed in the recording and reproduction system;

first means for detecting any drop-out generated in the reproduced signal;

second means responsive to the first detecting means for interrupting the supply of said clock signal to the receiver for the period of the detected drop-out; said receiver comprising:

means for storing and decoding the supplied digital image data and responsive to the second means for compensating an interrupted digital image signal due to said drop-out with image data previously stored in said storing and decoding means for the period of the drop-out; and third means including a reference oscillator for controlling the storing and decoding means and for controlling an oscillation frequency and phase of the reference oscillator on the basis of the supplied clock signal and for holding the frequency and phase of the reference oscillator at respective values immediately above the interruption by the second means.

* * * * *

UNITED STATES PATENT AND TRADEMARK OFFICE
CERTIFICATE OF CORRECTION

PATENT NO. : 4,943,358

DATED : July 24, 1990

INVENTOR(S) : Kitaura et al

It is certified that error appears in the above-identified patent and that said Letters Patent is hereby corrected as shown below:

On the title page, item "[73] Assignee:" should read:

--Matsushita Electric Industrial Co.,
Ltd., Osaka, Japan and
Nippon Hoso Kyokai, Tokyo, Japan--

Signed and Sealed this

Seventh Day of April, 1992

*Attest:*

HARRY F. MANBECK, JR.

*Attesting Officer*          *Commissioner of Patents and Trademarks*